(12) United States Patent
Gagnon et al.

(10) Patent No.: US 9,669,944 B2
(45) Date of Patent: Jun. 6, 2017

(54) LIGHTING ARRAY FOR AN AIRCRAFT

(71) Applicant: BOMBARDIER INC., Dorval (CA)

(72) Inventors: Pierre Gagnon, Vaudreuil (CA); Nicolas Letendre, Longueil (CA)

(73) Assignee: BOMBARDIER INC., Dorval, Quebec (CA)

( * ) Notice: Subject to any disclaimer, the term of this patent is extended or adjusted under 35 U.S.C. 154(b) by 0 days.

(21) Appl. No.: 14/403,906

(22) PCT Filed: May 30, 2013

(86) PCT No.: PCT/US2013/043382
§ 371 (c)(1),
(2) Date: Nov. 25, 2014

(87) PCT Pub. No.: WO2013/181402
PCT Pub. Date: Dec. 5, 2013

(65) Prior Publication Data
US 2015/0146443 A1      May 28, 2015

Related U.S. Application Data

(60) Provisional application No. 61/653,797, filed on May 31, 2012.

(51) Int. Cl.
| B64D 47/02 | (2006.01) |
| B64F 1/20 | (2006.01) |
| F21V 1/20 | (2006.01) |
| F21V 21/00 | (2006.01) |
| B64D 47/06 | (2006.01) |
| B64D 47/04 | (2006.01) |

(52) U.S. Cl.
CPC ............. *B64D 47/06* (2013.01); *B64D 47/02* (2013.01); *B64D 47/04* (2013.01); *B64D 2203/00* (2013.01)

(58) Field of Classification Search
CPC ........ B64D 47/02; B64D 47/04; B64D 47/06; B64D 2203/00
USPC .................................................. 362/470, 472
See application file for complete search history.

(56) References Cited

U.S. PATENT DOCUMENTS

| 6,244,728 B1 | 6/2001 | Cote et al. |
| 6,963,293 B1 | 11/2005 | Rast |
| 2011/0019430 A1 | 1/2011 | Wilkinson et al. |
| 2012/0069592 A1 | 3/2012 | Natsume et al. |

FOREIGN PATENT DOCUMENTS

EP    2327629 A1    6/2011

OTHER PUBLICATIONS

International Search Report and Written Opionion dated Jan. 28, 2014, for International Patent Application No. PCT/US2013/043382.

(Continued)

*Primary Examiner* — Jason Moon Han
(74) *Attorney, Agent, or Firm* — Karceski IP Law, PLLC

(57) ABSTRACT

A lighting arrangement for an aircraft includes a navigational lighting group disposed at a leading edge of a wing of the aircraft. The navigational lighting group includes at least one right of way light. The lighting arrangement also includes a light bar extending along at least a portion of the leading edge of the wing, adjacent to the navigational lighting group. The light bar is configured to emit light along a length thereof.

24 Claims, 11 Drawing Sheets

(56) References Cited

OTHER PUBLICATIONS

Cirrus Aircraft News—"The All-New 2014 Generation 5 Cirrus Aircraft", printed Jan. 16, 2014, website: http://cirrusaircraft.com/news/the-all-new-2014-generation-5-cirrus.
Advertisement—Goodrich, "LED Navigation Light Retrofit for Bombardier Aircraft," Sep. 2008.
Advertisement—Whelen Engineering Company, Inc., "LED Navitation Lights", Form # LNL 0208, 2008.
Chinese Office Action dated Jul. 3, 2015, for Chinese Patent Application No. 201380028932.0.
Chinese Office Action dated Feb. 26, 2016, for Chinese Patent Application No. 201380028932.0.
Chinese Office Action dated Sep. 20 2016, for Chinese Patent Application No. 201380028932.0.

LIGHTING ARRAY FOR AN AIRCRAFT

CROSS-REFERENCE TO RELATED APPLICATION(S)

This is a National Stage Entry into the United States Patent and Trademark Office from International PCT Patent Application No. PCT/US2013/043382, having an international filing date of May 30, 2013, which relies for priority on U.S. Provisional Patent Application Ser. No. 61/653,797, filed May 31, 2012, the entire contents of both of which are hereby incorporated by reference in their entireties.

FIELD OF THE INVENTION

The present invention concerns the construction of the wing of an aircraft. More specifically, the present invention concerns the construction for the wingtip of an aircraft that includes a lighting array.

DESCRIPTION OF THE RELATED ART

Due to various avionic regulations worldwide, all aircraft are required to include specific lighting for operation for all times of the day, including nighttime operation. At a minimum, each aircraft is required to include three navigation lights. Navigation lights encompass a white light at the rear of the aircraft, a green light at the tip of the right wing, and a red light at the tip of the left wing (consistent with traditional maritime conventions).

The red and green lights often are referred to as "right of way" lights. As noted, by convention, the red light is placed on the port (or left) side of the aircraft. The green light is positioned on the starboard (or right) side of the aircraft.

It is noted that some aircraft include high intensity strobe lights to provide additional visibility to other pilots. As a common convention, strobe lights delineate the outermost ends of the aircraft, such as the wing tips and tail.

In addition, aircraft typically include one or more white lights to illuminate what is ahead of the aircraft, much like the headlights on an automobile. These lights are commonly referred to as "landing lights."

Some modern aircraft include what is referred to as a "winglet" at the tips of the aircraft's wing. A winglet enhances the aerodynamic properties of the wing to which it is attached. Where the aircraft's wings are provided with winglets, the navigation lights typically are positioned at the tip of the wing, inboard from the winglet.

While the navigational lights are required for operation of the aircraft at all times of the day or night, a desire has developed to provide additional lighting at the aircraft's wing tips.

Specifically, when aircraft are taxiing at an airport, there is always the possibility that the wings of two aircraft might interfere with one another, especially when the aircraft are grouped closely together, such as near to a passenger boarding gate.

U.S. Pat. No. 6,963,293 (hereinafter "the '293 patent") describes a system and method of preventing aircraft wingtip ground incursion. The '293 patent describes a wingtip illumination (light) with a pattern source 12, such as a laser, which casts a beam 14 onto an obstruction to "paint" the obstruction with the laser light. (The '293 patent at col. 6, lines 5-14.) With light pattern illuminating the obstruction, such as the wingtip of another aircraft, the pilot is able to avoid the obstruction.

Navigation lights using light emitting diodes ("LEDs") also are known in the art. One example is provided by U.S. Pat. No. 6,244,728 (hereinafter "the '728 patent"). The '728 patent describes a position light 10 including a plurality of LEDs 25. (The '728 patent at col. 5, lines 37-52.)

While the prior art is replete with various implementations for navigation lights and at least one example of an obstruction avoidance system (i.e., the '293 patent), the prior art exhibits a dearth of other types of aircraft exterior lighting for aircraft.

SUMMARY OF THE INVENTION

The present invention addresses one or more deficiencies associated with aircraft lighting known in the prior art.

The present invention provides, among other things, an illuminated strip, which may be incorporated into or applied onto the tip of an aircraft's wings to provide enhanced visibility for the wingtip.

In one contemplated embodiment, the present invention provides a lighting arrangement for an aircraft that includes a navigational lighting group disposed at a leading edge of a wing of the aircraft. The navigational lighting group comprises at least one light emitting source. The arrangement also includes a light bar extending along at least a portion of the leading edge of the wing, adjacent to the navigational lighting group. The light bar is configured to emit light along a length thereof.

It is also contemplated that the light bar may include a plurality of light bars disposed parallel to one another.

In one contemplated embodiment, the light bar may be a plurality of light bars arranged end-to-end.

Alternatively, the light bar may be disposed outboard of the navigational lighting group.

Still further, the light bar may be disposed inboard of the navigational lighting group.

In another contemplated embodiment, the light bar may be disposed both inboard and outboard of the navigational lighting group.

It is also contemplated that the light bar may extend along at least a portion of a longitudinal surface of the wing.

In another embodiment, the light bar may extend along at least a portion of a rear surface of the wing.

It is contemplated that the wing may include a winglet. If so, the light bar may extend along at least a portion of a leading edge of the winglet.

Alternately, the light bar may extend along at least a portion of a longitudinal surface of the winglet.

Still further, the light bar may extend along at least a portion of a rear edge of the winglet.

In one contemplated embodiment, the light bar includes a passive light strip. If so, the passive strip may receive input light from a light source selected from a group comprising a light emitting diode, an organic light emitting diode, a laser, a halogen light bulb, an incandescent light bulb.

It is also contemplated that the present invention includes a controller connected to the light source to change at least one of a color of the light, a hue of the light, an intensity of the light, and a pulsation of the light.

Where a passive light strip is employed, the passive light strip may include a light pipe and/or a plurality of optic fibers stranded together.

It is contemplated that, for a passive light strip, a surface of the passive light strip may be treated to increase emission of light therefrom. The surface may be etched. Alternatively, the light strip may be etched internally to increase emission of light therefrom.

In another contemplated embodiment, the light bar may be an active light strip.

If so, the active light strip may include a light emitter such as a light emitting diode, an organic light emitting diode, an electroluminescent material, an incandescent bulb, and a gas-filled bulb.

It is also contemplated that the present invention provides for a lighting arrangement where the light bar includes a light strip and a lens. Here, the light strip may be disposed behind the lens. Alternatively, the light strip may be embedded within the lens.

It is contemplated, as a part of the present invention, that the lens resists erosion. It is also contemplated that the lens resists degradation from ultraviolet light.

Still further features of the present invention should be appreciated from the drawings appended hereto and from the discussion herein.

BRIEF DESCRIPTION OF THE DRAWINGS

The present invention will now be described in connection with the drawings appended hereto, in which.

DETAILED DESCRIPTION OF EMBODIMENT(S) OF THE INVENTION

The present invention will now be described in connection with one or more embodiments. Discussion of any one particular embodiment is intended to be illustrative of the breadth and scope of the invention. In other words, while attention is focused on specific embodiments, those embodiments are not intended to be limiting of the scope of the present invention. To the contrary, after appreciating the discussion and drawings presented herein, those skilled in the art will readily appreciate one or more variations and equivalents of the embodiments described and illustrated. Those variations and equivalents are intended to be encompassed by the present invention as though they were described herein.

As a point of convention, as should be understood by those skilled in the art, an aircraft includes a front end and a rear end that define a longitudinal axis. The wings, which extend outwardly from the fuselage of the aircraft, define a lateral axis. In the discussion that follows, therefore, reference to a longitudinal axis is intended to refer to an axis parallel to the longitudinal axis of the aircraft. Similarly, reference to a lateral axis is intended to refer to an axis that is parallel to the lateral axis of the aircraft.

As another point of convention, the terms "front," "rear," "right," "left," "starboard," and "port" are intended to refer to directions that are consistent with the direction of travel of a conventional aircraft. The use of these conventions, however, is not intended to be limiting of the present invention. To the contrary, these terms are used merely to facilitate discussion of the considerable breadth and scope of the present invention.

Throughout the discussion that follows, the present invention will be discussed in connection with the wings of an aircraft. While the discussion of the present invention focuses on the wings of an aircraft, the present invention should not be considered as being limited to a "wing." To the contrary, the present invention may be applied to the tail section (or other aerodynamic surface) of an aircraft without departing from the scope of the present invention.

The present invention encompasses a lighting array that provides supplemental lighting at the tip of an aircraft's wings. Before discussing the details of the present invention, however, a brief overview of the navigational lighting group on a conventional aircraft wing is first described in connection with FIGS. 1-3.

Figure 1:
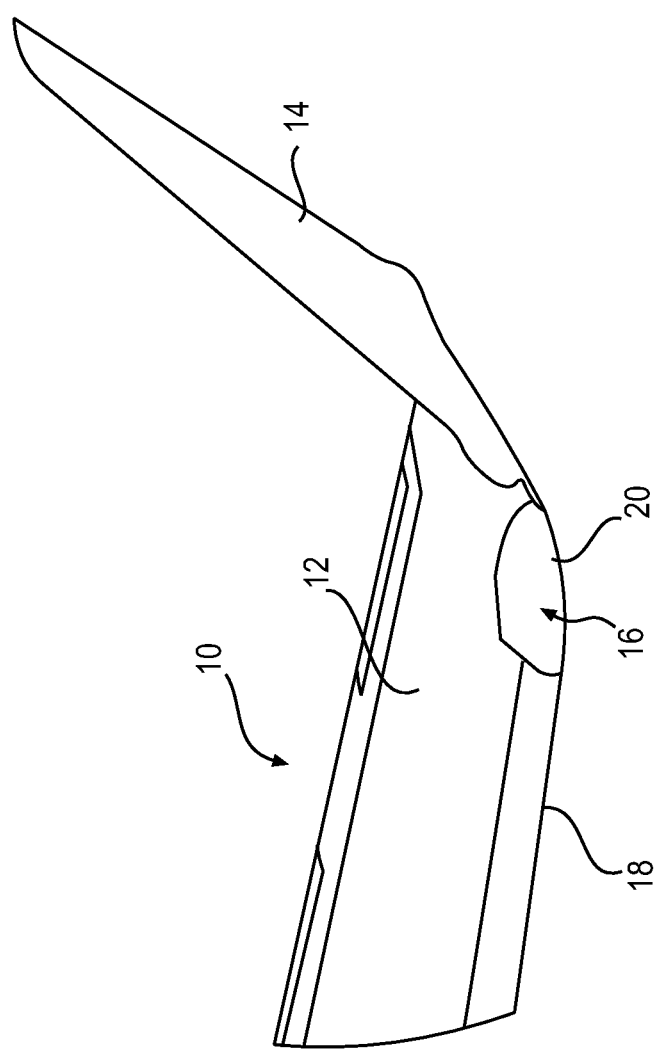
FIG. 1 is a perspective illustration of an example of a conventional aircraft wing, showing the position of the navigation lights adjacent to a winglet at the end of the wing.

FIG. 1 is a perspective view of the tip of a wing 10 for an aircraft. The wing 10 includes an airfoil surface 12 and a winglet 14. The airfoil surface 12 is the portion of the wing 10 that provides lift. The winglet 14 extends upwardly from the end of the airfoil surface 12. The winglet 14 provides drag reduction for the aircraft, among other benefits.

A conventional navigational lighting group 16 is positioned at the junction between the airfoil surface 12 and the winglet 14. As illustrated, the position of the navigational lighting group 16 is inboard of the winglet 14. The navigational lighting group 16 is positioned at or near the tip of the wing 10 such that light emitted therefrom is projected to the front of the aircraft and also to the side of the aircraft as required by various international laws and regulations.

Figure 2:
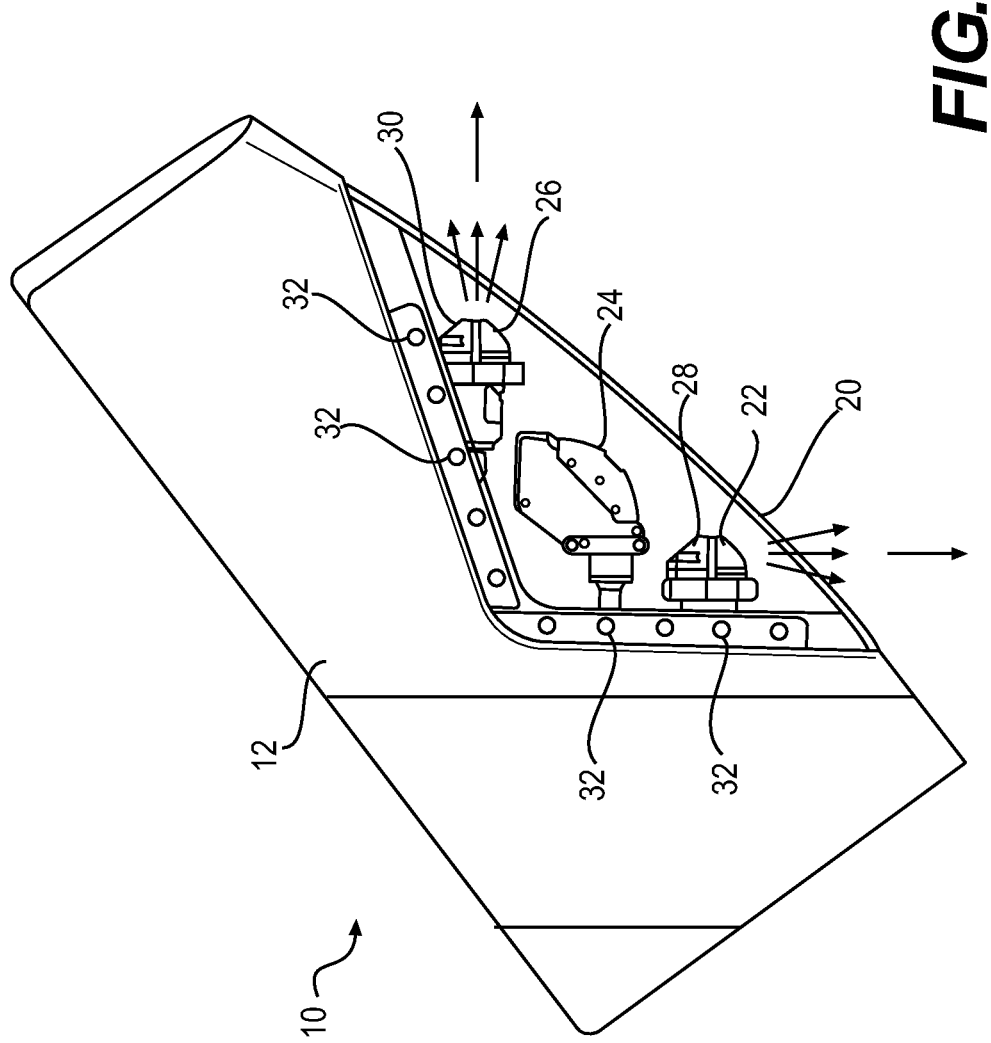
FIG. 2 is a top view of a conventional navigation light group for a wing.

FIG. 2 is a top view of the conventional navigational lighting group 16 depicted in FIG. 1. A portion of the airfoil surface 12 also is shown for context.

The navigational lighting group 16 occupies a V-shaped notch in the leading edge 18 of the airfoil 12. The navigational lighting group 16 is housed within a clear lens 20, which is shaped to conform to the part of the leading edge 18 of the airfoil surface 12 in which the navigational lighting group 16 is disposed.

In FIG. 2, the illustrated navigational lighting group 16 includes three light sources, a first light source 22, a second light source 24, and a third light source 26. The first and third light sources 22, 26 are right of way lights, such as the red or green lights for the left or right sides of the aircraft. The second light source 24 is a strobe light, which emits a white light as required by international laws and regulations.

In the illustrated embodiment, the first and third light sources 22, 26 rely on incandescent bulbs for illumination. The second light source 24, which is a strobe light that delineates the tip of the wing 10, may be a xenon gas strobe light.

As should be apparent to those skilled in the art, the first light source 22 is provided with a reflector 28 that directs the light primarily forward of the aircraft. The third light source 26 also includes a reflector 30. However, the reflector 30 for the third light source 26 directs the emitted light primarily to the side of the aircraft. As also shown in this view, the lens 20 connects to the airfoil surface 12 via several fasteners 32.

Figure 3:
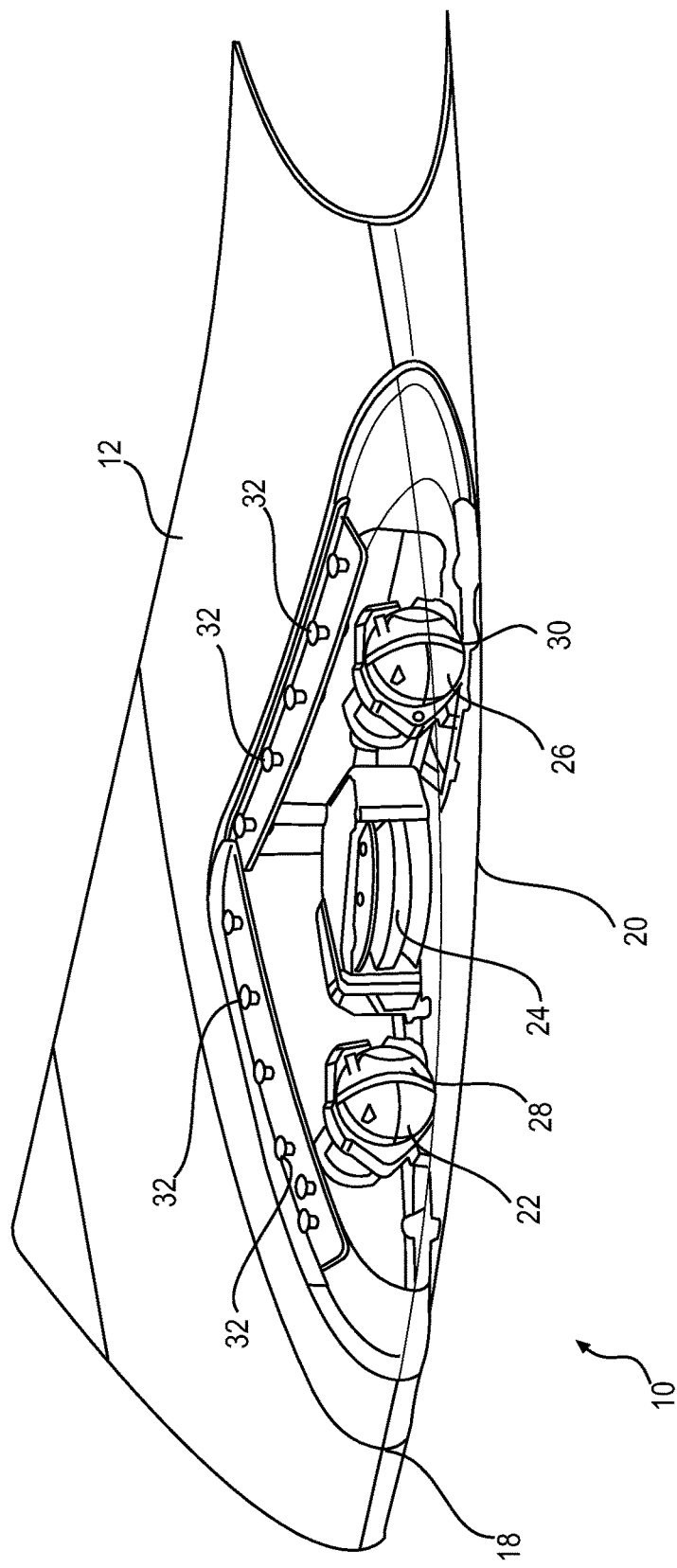
FIG. 3 is a perspective illustration of the conventional navigation light group shown in FIG. 2.

FIG. 3 is a perspective illustration of the conventional navigational lighting group 16 depicted in FIG. 2. The shape of the lens 20 is more clearly illustrated in this view as are the first, second, and third light sources 22, 24, 26.

Figure 4:
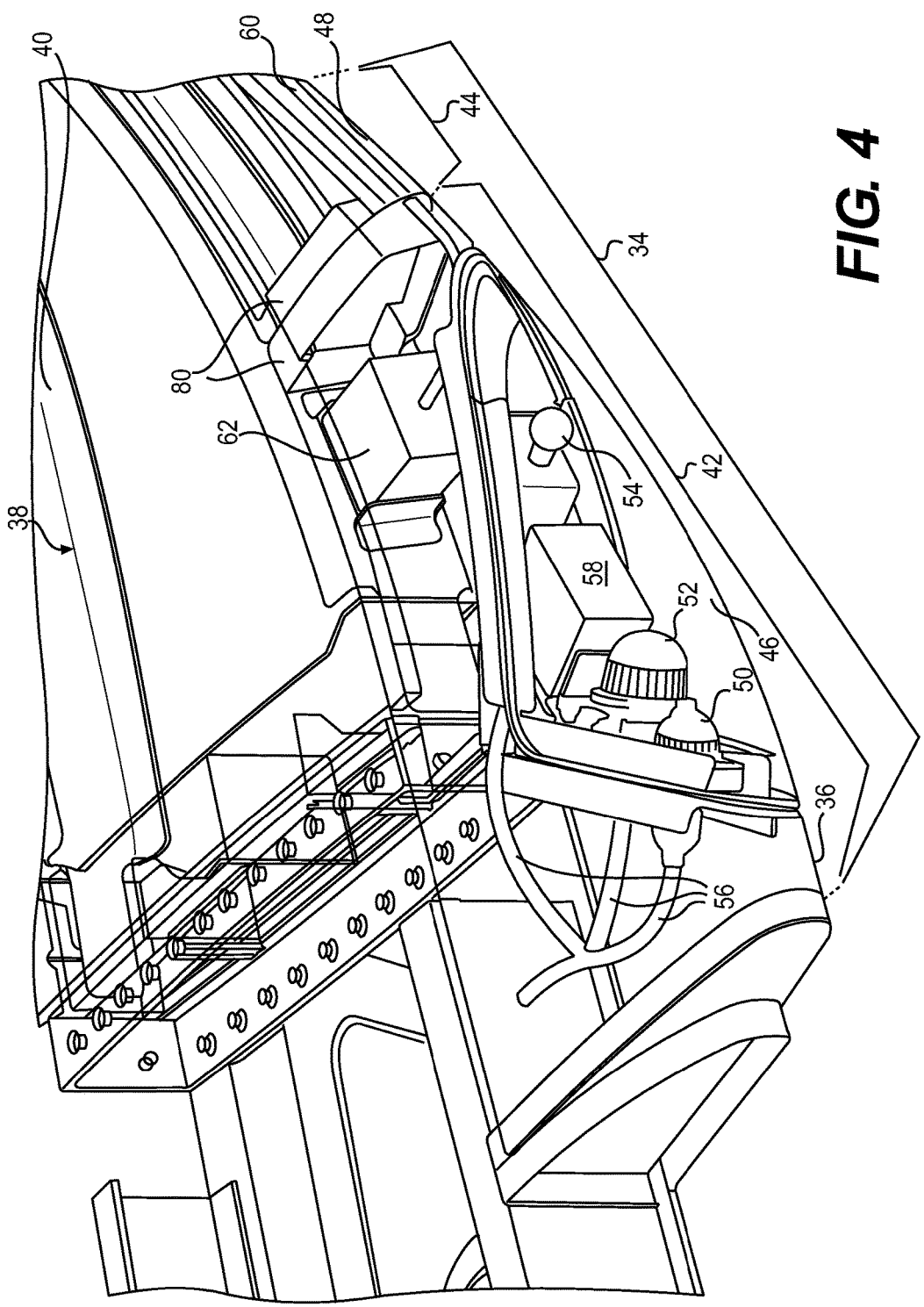
FIG. 4 is a perspective, detail of one embodiment of the wingtip lighting group of the present invention.

FIG. 4 is a perspective, sectional view of a first embodiment of a navigational lighting array 34 according to the present invention. As in the prior art example, the illustrated navigational lighting array 34 is incorporated into the leading edge 36 of the wing 38, which defines an airfoil surface 40.

The navigational lighting array 34 includes a navigational lighting group 42 and a light bar 44. The navigational lighting group 42 is housed within or behind a lighting group lens 46. Similarly, the light bar 44 is housed within or behind a light bar lens 48. The lenses 46, 48 may be made from any suitable material that permits light transmission therethrough. It is contemplated that the lenses 46, 48 may be made from a polymeric material, such as polycarbonate or acrylic. Separately, the lenses 46, 48 may be made from a glass material. The exact material used for the lenses 46, 48 is not critical to operation of the present invention and, therefore, is not considered to be limiting of the present invention.

In the embodiment illustrated in FIG. 4, the navigational lighting group 42 includes a first light source 50, a second light source 52, and a third light source 54. The first light source 50 and second light source 52 are right of way lights, which may be red or green depending upon the side of the aircraft where the navigational lighting group is positioned.

In the illustrated embodiment, the first light source 50 is contemplated to be an incandescent bulb. When activated, the first light source 50 is contemplated to provide a pulsating light. As should be apparent, the first light source 50 need not derive its illumination from an incandescent bulb. One or more light emitting diodes ("LEDs"), organic light emitting diodes ("OLEDs"), or other sources may be used. As should be apparent, any suitable light source may be employed without departing from the scope of the present invention.

The second light source 52 is positioned adjacent to the first light source 50. The second light source 52 also is contemplated to be powered by an incandescent light bulb. When activated, it is contemplated that the second light source 52 will provide a constant (i.e., non-pulsating) illumination. As with the first light source 50, the second light source 52 may generate its illumination from an incandescent light bulb. It is contemplated that any suitable, alternative light source may be employed for the first and second light sources 50, 52 without departing from the scope of the present invention.

The third light source 54 is contemplated to be a strobe light. As in the prior art, it is contemplated that light will be generated from a xenon flash tube. Of course, the light may be generated from any other suitable source without departing from the scope of the present invention.

With respect to the navigational lighting group 42, it is noted that the number, placement, and composition of the light sources 50, 52, 54 is not intended to be limiting of the present invention. For example, the light sources 50, 52, 54 may be placed in any order and in any suitable configuration. Moreover, there may be a larger or a fewer number of light sources 50, 52, 54, as required by law. As should be apparent to those skilled in the art, avionics law determines the number, placement, and configuration of the navigational lights that are required for a particular aircraft.

As also illustrated in FIG. 4, a number of wires 56 provide power and/or various electrical signals to the navigational lighting group 42. In addition, in the illustrated embodiment, the navigational lighting group 42 includes a controller 58, which is contemplated to control the operation of the first, second, and third light sources 50, 52, 54. In this embodiment, the controller 58 is provided behind the lighting group lens 46, because this is a convenient location for access to the controller 58, should maintenance and/or replacement be necessary. As should be apparent, however, the controller 58 need not be enclosed behind the lighting group lens 46. The controller 58 may be positioned elsewhere without departing from the scope of the present invention.

The navigational lighting array 34 also includes a light strip 60, which is positioned beneath the light strip lens 48. The light strip 60 is contemplated to be a light pipe that receives inputted light from a light generator 62.

As noted above, the lenses 46, 48 may be made from a polymeric material, such as polycarbonate or acrylic. Separately, the lenses 46, 48 may be made from a glass material. The exact material used for the lenses 46, 48 is not critical to operation of the present invention and, therefore, is not considered to be limiting of the present invention. It is contemplated that, regardless of the material employed for the lens 46, 48, the material will resist degradation over time from adverse environmental conditions such as erosion, temperature, debris, ultraviolet light, etc. Erosion refers to the slow degradation of the lens 46, 48 due to impacts from dust, dirt, and other debris that may impact the lens 46, 48. With respect to damage from ultraviolet light, it is understood that some polymeric materials have a tendency to cloud or become progressively opaque after extended exposure to sunlight, for example. As should be apparent, if the lens 46, 48 darkens or clouds, less light will be transmitted through the lens 46, 48, thereby affecting the brightness of the light emitted therefrom.

In addition, while the illustrated embodiment places the light strip behind a separate lens 46, 48, such an arrangement of parts is not required to practice the present invention. In one embodiment, it is contemplated that the light strip 60 may be incorporated into the lens 46, 48. In still another contemplated embodiment, the light strip may incorporate a protective layer such that the light strip 60 may be affixed to the surface of the winglet 14. Still other variations, as should be apparent to those skilled in the art, are contemplated to fall within the scope of the present invention.

The light strip 60 may be made, for example, from a fiber optic material. If made from a fiber optic material, it is contemplated that the light strip 60 may be a single optic fiber light pipe (i.e., with a large diameter) or may made from a plurality of individual optic fibers (i.e., with small diameters) that are stranded together. The surface of the light strip 60 may be conditioned to increase the transmission of light therefrom. For example, the surface of the light strip 60 may be etched, engraved, or otherwise treated to maximize light emission from the sides thereof.

Alternatively, the interior of the light strip 60 may be conditioned to maximize light transmission therefrom. For example, the interior of the light strip 60 may be laser etched to create microscopic imperfections so that light will be emitted through the sides of the light strip 60. As should be apparent, the light strip 60 may be made from any suitable material and may be manufactured according to any suitable method to create a structure that emits light along the length thereof.

As noted above, in the embodiment illustrated in FIG. 4, the light strip 60 is connected to a light generator 62. The light generator 62 is positioned behind the navigational lighting group 42. The light generator 62 houses a light source, such as an incandescent bulb, halogen bulb, LED, OLED, laser, or the like, that emits light as an input into the light strip 60. The light may then be conducted along the light strip 60 for emission through the light strip lens 48.

In one contemplated embodiment, the light strip 60 may not have a separate, dedicated light generator 62. Instead, the light strip 60 may receive, as input light, light generated by one or more of the light sources 50, 52, 54. Still other arrangements are contemplated to fall within the scope of the present invention, as should be appreciated by those skilled in the art.

In a separate embodiment, the light strip 60 need not be a light conductor that receives and redirects light as a passive lighting element. Instead, the light strip 60 may be an active lighting member made of a continuous (or semi-continuous) layer of light-emitting materials or components. In this embodiment, the light strip 60 may be made from a strip of an LED material (much like the display for a television or computer display), an OLED material, an electroluminescent layer, or the like. In this embodiment, the light strip 60 may be an essentially continuous, active, lighted strip. As an "active" lighted strip, it is contemplated that an electrical signal will be provided to the light strip 60 to produce light thereby.

In another contemplated embodiment, the light strip 60 may constitute a string of individual light sources, such as LEDs or OLEDs that are connected together in a string. This embodiment also contemplated that the light strip 60 may be made from a string of small halogen light bulbs, incandescent light bulbs, or similar light-emitting sources.

Still further, the light strip 60 may be made of a gas-filled tube, such as a neon tube, argon, tube, helium tube, or the like. In other words, the light strip 60 may be made from one or more gas discharge lamps or tubes.

As should be apparent from the foregoing, there are a large number of possible constructions for the light strip 60 of the present invention. No one particular embodiment is intended to be representative or limiting of the present invention.

From the wide variety of different sources of illumination that are possible, LEDs, OLEDs, lasers, and electroluminescent materials are considered to be the types of materials that are most readily adaptable for use in or with the light strip 60 of the present invention. LEDs, OLEDs, and lasers, in particular, require little energy, generate little heat, are able to generate particularly intense light, and may be constructed to generate different hues of light for the light strip 60.

In one contemplated embodiment, it is contemplated that the light strip 60 may be connected to a controller so that the hue/color of the light emitted from the light strip 60 is changeable. There are a number of reasons that this may be desirable. For example, it may be desirable, when the aircraft is in flight, for the light strips 60 to emit light consistent with the right of way lights positioned adjacent thereto. In this embodiment, when the aircraft is in flight, the light strip 60 on the left side of the aircraft may be instructed to emit a red light consistent with the light produced by the adjacent navigational light group 42. Similarly, the light strip 60 on the right side of the aircraft may be instructed to produce a green light.

In a further contemplated embodiment, the light strips 60 may be configured to receive signals to produce a white light when the aircraft is in flight. In this contemplated embodiment, the white light may assist other pilots to understand the shape and orientation of the aircraft.

Still further, the light strips 60 may receive signals to emit different colors and/or hues of light. In this embodiment, the light strips 60 may be configured to display a color or hue of light that is consistent with the color scheme for a particular airline or commercial carrier. For example, FedEx® uses orange and purple as identifying colors. In the context of the present invention, the light strip 60 one side of the aircraft may emit an orange light while the light strip 60 on the other side of the aircraft may emit a purple light. This may help a pilot to identify the company associated with an aircraft when in flight or grounded, if necessary.

In another contemplated embodiment, where the light strip 60 is constructed to emit light of different colors, it is contemplated that the light strip 60 may produce one color of light in flight and another color of light when on the ground. In this embodiment, the light strip 60 may produce a white light (or a light consistent with the right of way convention) while the aircraft is in flight and produce a color of light consistent with the airline's colors when the aircraft is on the ground (and, therefore, visible to airline passengers, for example).

As should be apparent from the foregoing, there are virtually limitless variations of lighting colors and color arrangements that may be offered by the light strip 60 of the present invention.

In still other variations, the light strip 60 may emit light of varying intensity. In addition, it is contemplated that the light strip may produce pulsed light. Still further, the light strip may be controlled to produce both varying intensity light and pulsed light.

With continued reference to FIG. 4, it is noted that the wing 38 that incorporates the navigational lighting array 34 of the present invention need not include a winglet 14. To the contrary, the navigational lighting array 34 of the present invention is equally applicable to a wing 38 that does not incorporate a winglet 14.

Figure 5:
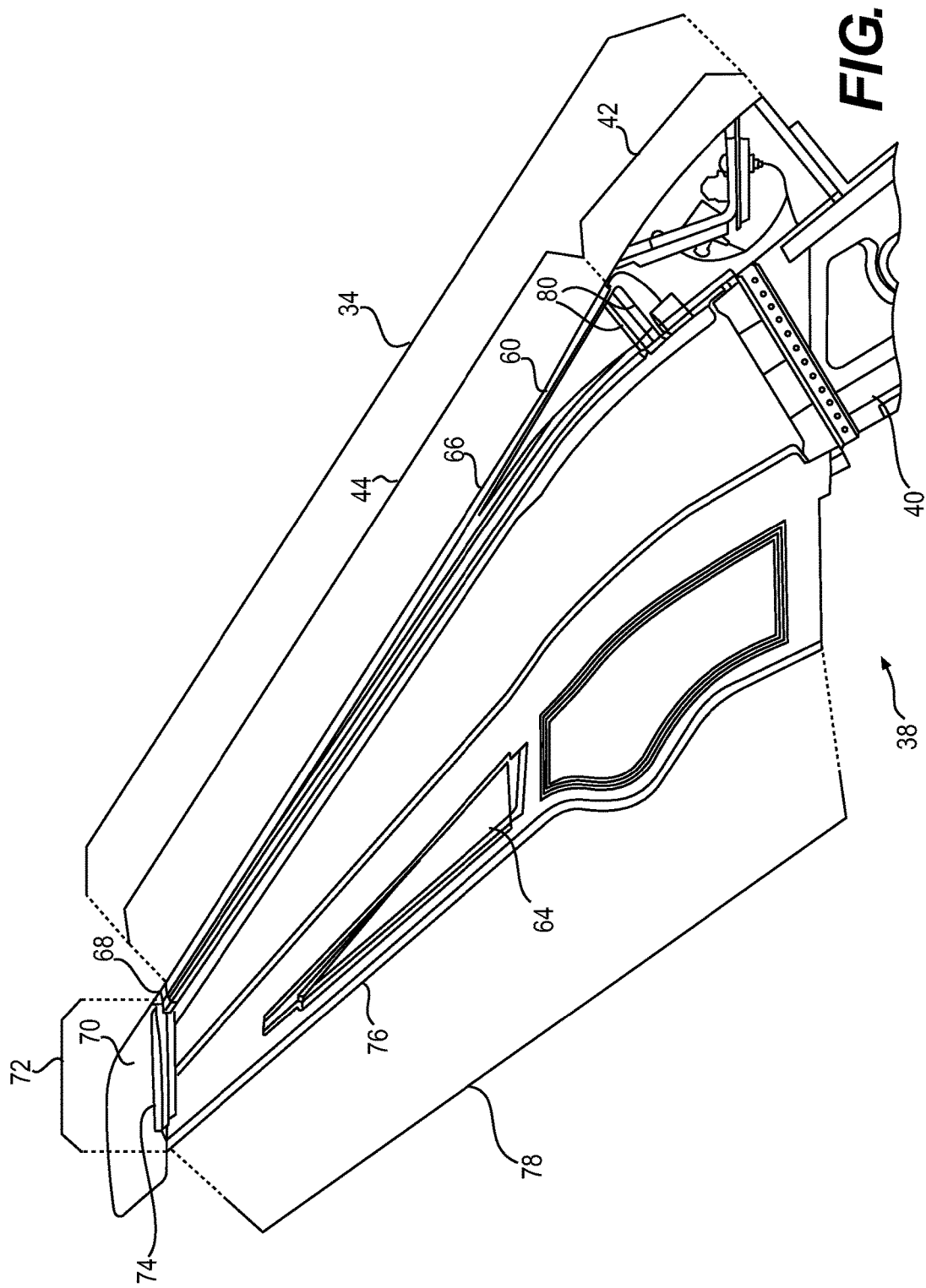
FIG. 5 is a top view of the wingtip lighting group illustrated in FIG. 4.

FIG. 5 is a top view of the end of a wing 38 including the navigational lighting array 34 of the present invention, as illustrated in FIG. 4. In this embodiment, the wing 38 includes a winglet 64 attached to the airfoil surface 40. The light strip 60 extends along the leading edge 66 of the wing 38 from a position adjacent to the navigational lighting group 42. As also illustrated, the light strip 60 extends to the tip 68 of the winglet 64. In the illustrated embodiment, the tip 68 of the winglet 64 includes a stabilizer 70.

In one embodiment of the present invention, it is contemplated that the light strip 60 may extend beyond the tip 68 of the winglet 68 to the longitudinal surface 72 defined by the end 74 of the winglet 64. The longitudinal surface 72 also may be referred to as the tip of the winglet 68. Since the winglet is disposed at an angle to a horizontal plane, the longitudinal surface 72 also may be referred to as the top surface of the winglet 68. For purposes of the present invention, the term longitudinal surface 72 is intended to encompass any portion of the wing 38 that extends along a direction consistent with the longitudinal axis of the aircraft.

In still another contemplated embodiment, the light strip 60 may extend to the rear of the winglet, along a rear edge 76 of the winglet 64. In FIG. 5, a distance 78 is identified along the rear end 76 of the winglet 64. The light strip 60, in this embodiment, may extend along any portion of the distance 78, as desired.

In a further embodiment, the light strip 60 may also extend to a rear edge of the wing 38.

With reference to the embodiments discussed in connection with the wing 38, it is noted that the present invention is not limited to a single light strip 60. To the contrary, the light strip 60 may be constructed from a plurality of light strips 60 that are arranged, end-to-end, along the leading edge 66, the longitudinal surface 72, and/or the rear edge 76 of the wing 38, as desired. In addition, it is noted that the light strip 60 may be constructed from a plurality of light strips 60 that are arranged in parallel along one or more of the same edges of the wing 38. In other words, the present invention should not be understood to be limited to a single light strip 60, as should be apparent to those skilled in the art.

With continued reference to FIGS. 4 and 5, it is noted that the navigational lighting group 42 is separated from the light bar 44 by a barrier 80. While included in this embodiment as a demarcating structure between the navigational lighting group 42 and the light bar 44, the barrier is not required to practice the present invention. It is contemplated that the navigational lighting group 42 and the light bar 44 will be separate components of the wing 38 for maintenance and replacement purposes. For example, if the navigational lighting group 42 needs to be replaced due to damage, for example, it is considered to be more expedient to replace the damaged components without having to replace the entire navigational lighting array 34.

Also with reference to FIGS. 4 and 5, it is noted that the light strip 60 is positioned near to the leading edge 36 of the wing 38. It is contemplated that this construction will assist with maximum visibility of the light strip 60. As should be apparent to those skilled in the art, however, the light strip 60 need not be positioned in this location to practice the present invention. Other positions of the light strip 60 may be employed without departing from the scope of the present invention.

Figure 6:
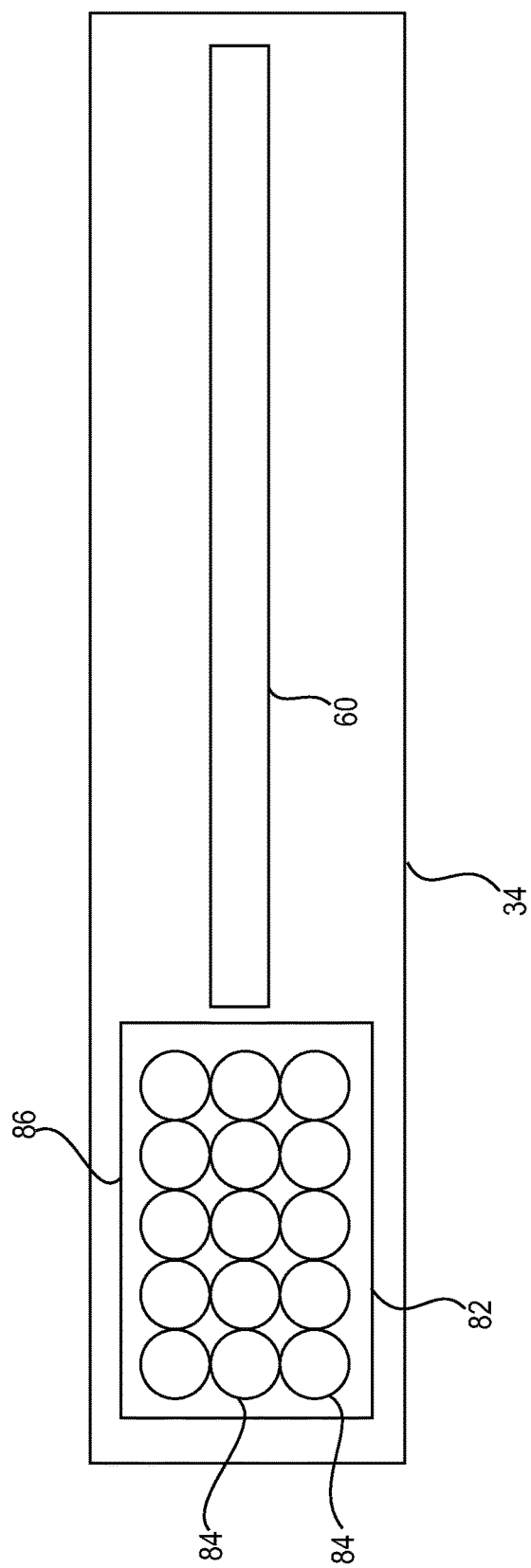
FIG. 6 is a graphical, front view of one contemplated embodiment of a wingtip lighting group according to the present invention.

FIG. 6 is a graphical illustration of one contemplated embodiment of a combined navigational lighting group 82 and light strip 60 that, together, form the navigational lighting array 34 of the present invention. In this embodiment, the lighting group 82 includes a plurality of individual LEDs 84 that are arranged in a side-by-side and stacked fashion. The light strip 60 may be a light pipe that receives illumination from a light source disposed within the LED housing 86. As noted, where the light strip 60 is an active light strip 60, the light strip 60 may receive electrical power from one or more of the wires 56 that connect to the navigational lighting array 34 (as illustrated in FIG. 4, for example).

Figure 7:
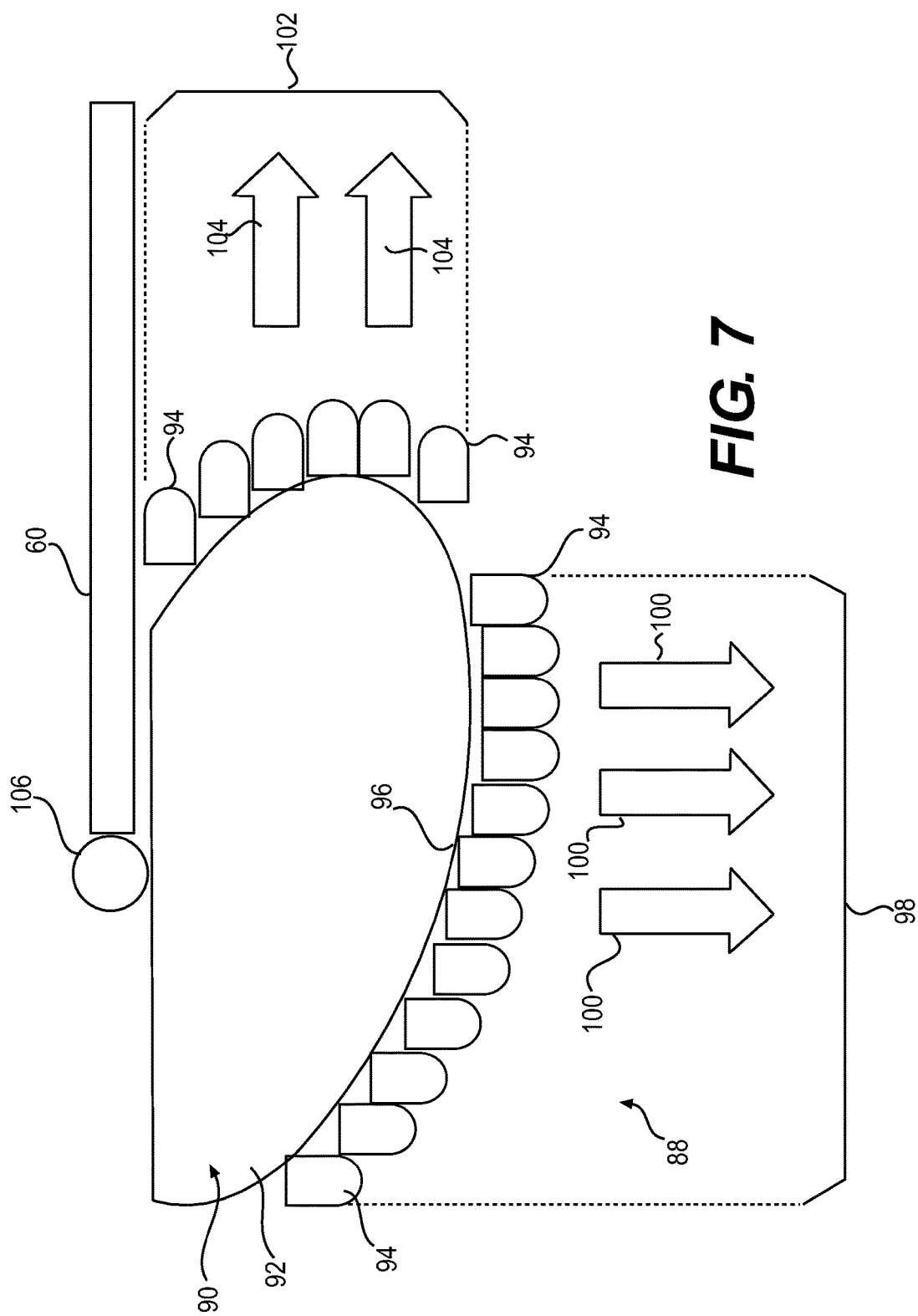
FIG. 7 is a graphical, top view of another contemplated embodiment of a wingtip lighting group according to the present invention.

FIG. 7 is a graphical, top view of a further embodiment of a navigational lighting array 88 according to the present invention. Here, the navigational lighting group 90 includes an LED housing 92 with a plurality of LEDs 94 arranged on its surface 96. A first group 98 of the LEDs 94 is forward-facing so that light emitted therefrom is directed along the arrows 100 to the front of the aircraft. A second group 102 of the LEDs 94 is laterally-facing so that light emitted therefrom is directed consistent with the arrows 104 to the side of the aircraft. The light strip 60 is contemplated to be a passive light strip 60, which receives inputted light from a light source 106, which is positioned behind the LED housing 92.

Figure 8:
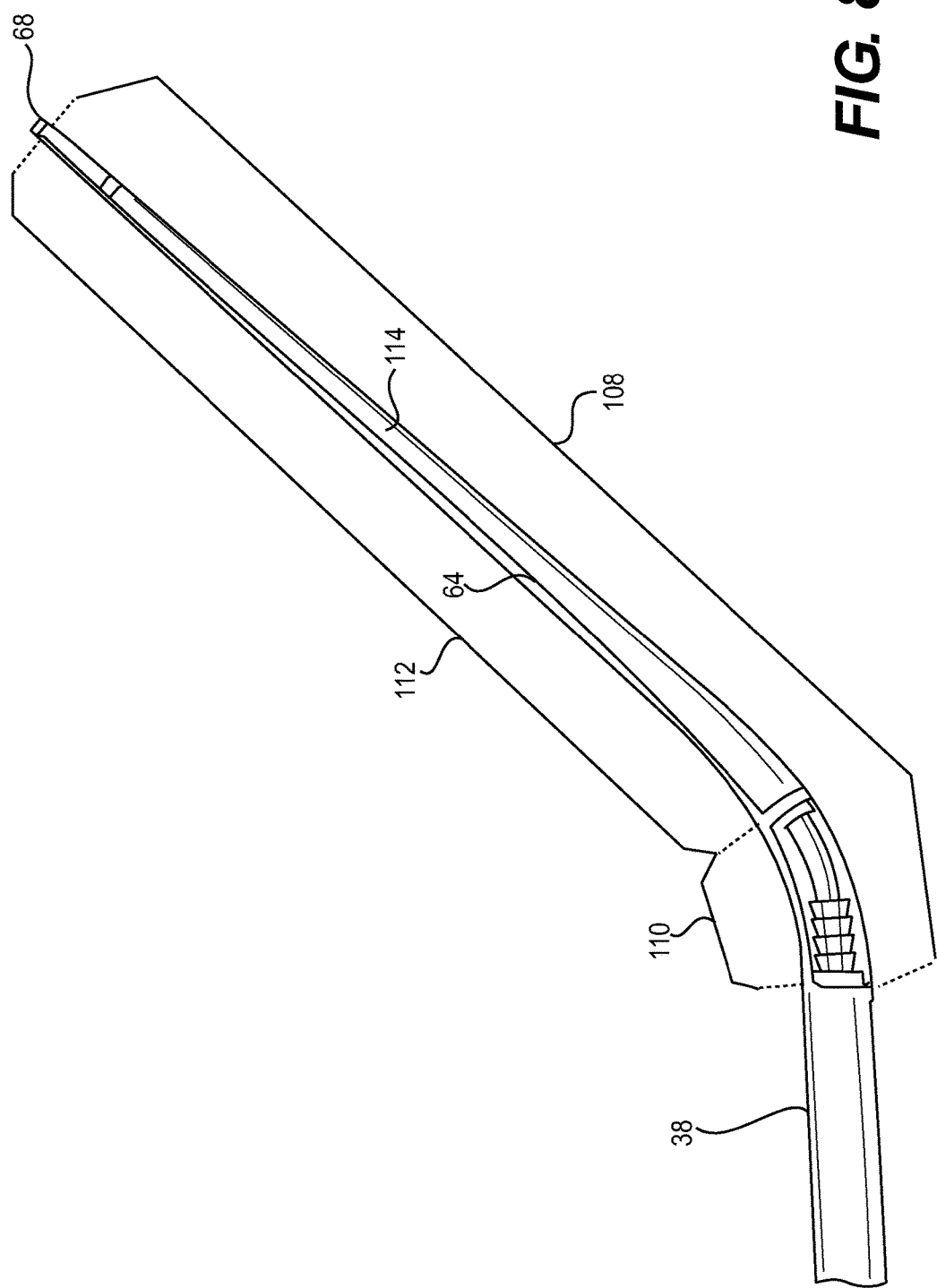
FIG. 8 is a front view of a further contemplated embodiment of a wingtip lighting group according to the present invention.

FIG. 8 is a front view of an embodiment of a navigational lighting array 108, as it might appear on the front of the wing 38. The navigational lighting array 108 includes a navigational lighting group 110 and a light bar 112 consistent with the discussion of the present invention provided above. As is apparent, the light bar 112 extends along the leading edge 114 of the winglet 64.

Figure 9:
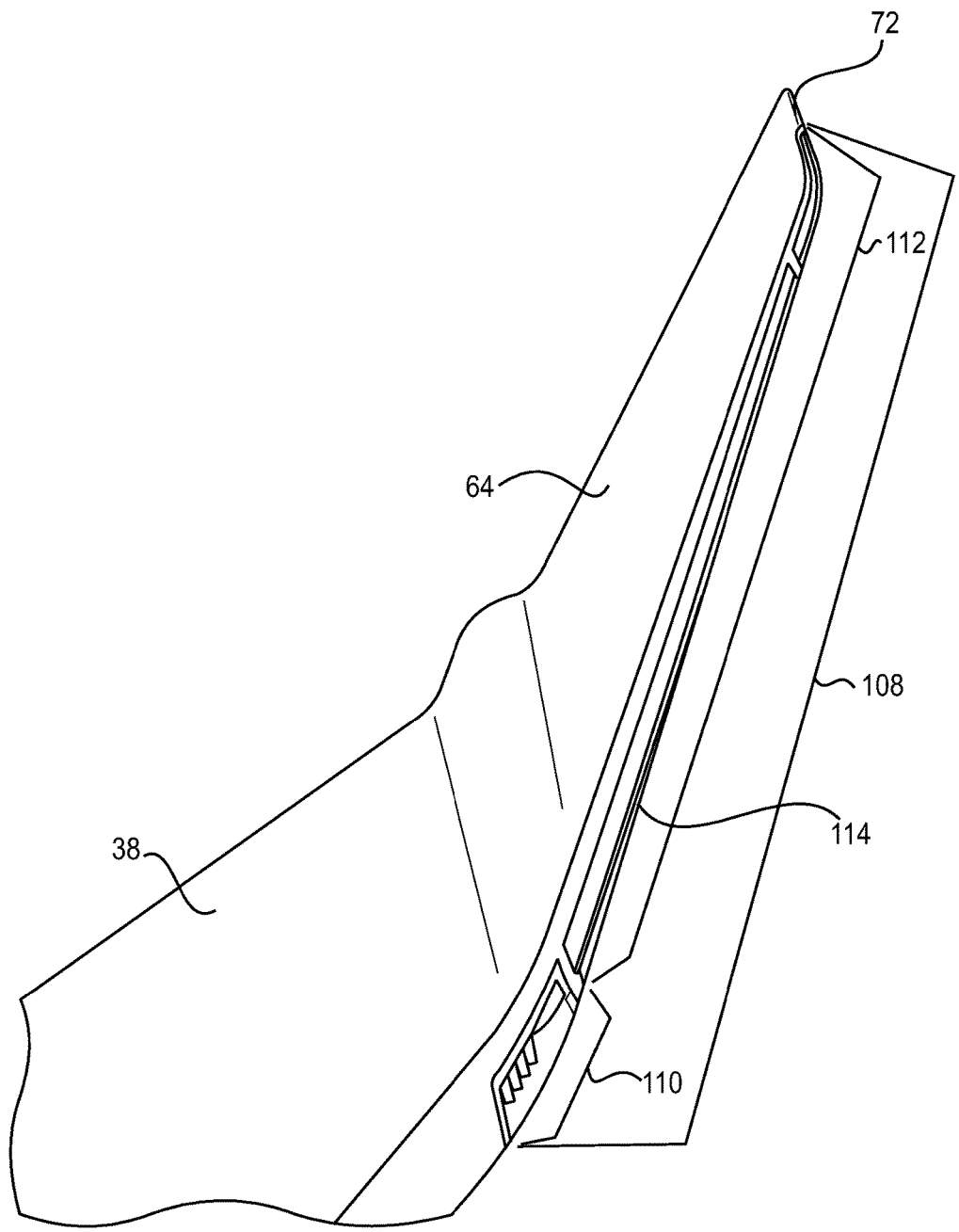
FIG. 9 is a perspective view of the wingtip lighting group illustrated in FIG. 8.

FIG. 9 is a perspective, top view of the embodiment of the navigational lighting array 108 that is shown in FIG. 8. As illustrated, a portion of the light bar 112 extends along part of the lateral surface 72 of the winglet 64 in this embodiment.

Figure 10:
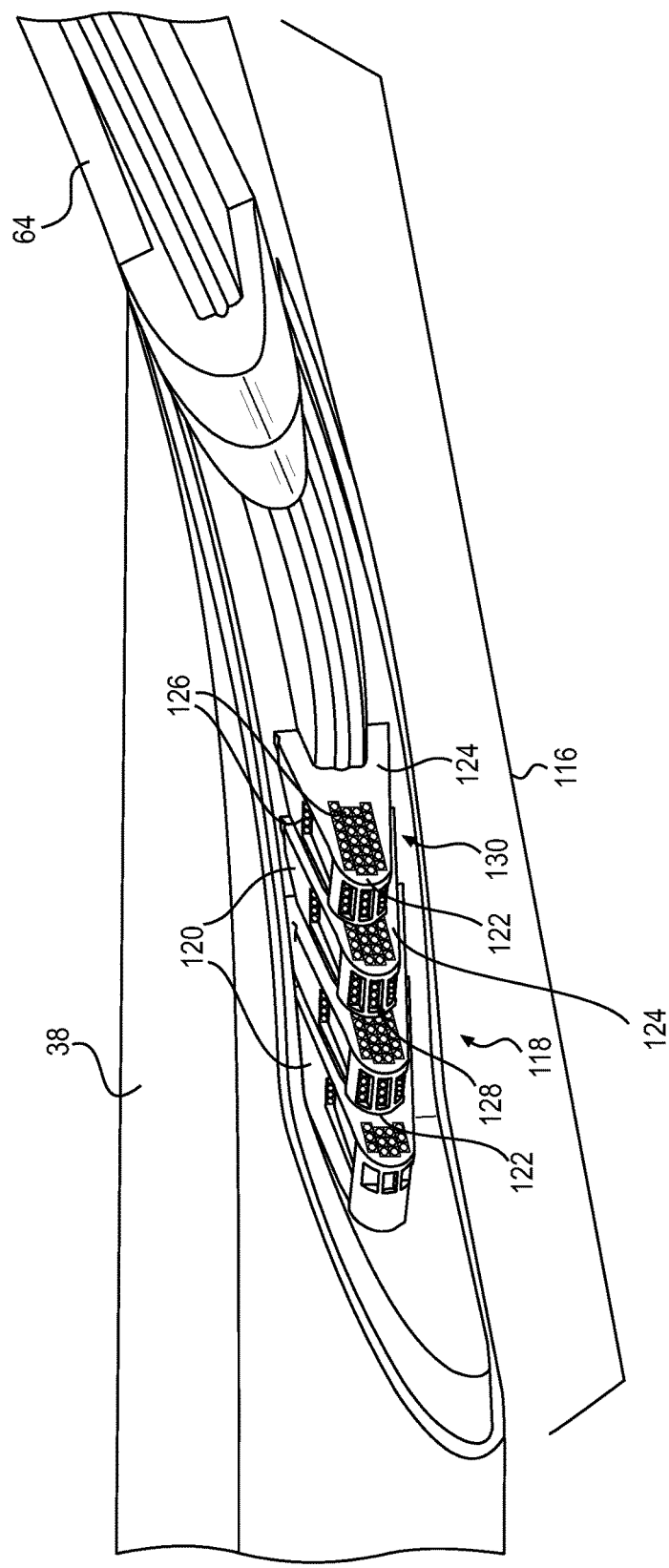
FIG. 10 is a perspective, front view of still another embodiment of a wingtip lighting group according to the present invention.

FIG. 10 is a perspective view of a portion of another embodiment of a navigational lighting array 116 according to the present invention. Here, the navigational lighting group 118 includes four stepped LED housings 120 disposed adjacent to one another. Each stepped LED housing 120 includes a U-shaped front surface 122 and a side surface 124 that include a plurality of LEDs 126 therein. Consistent with the discussion above, the first group 128 of LEDs 126 are disposed on or in the front surface 122 of the stepped LED housings 120 to provide light forward of the aircraft. The second group 130 of LEDs 126 is positioned on or in the side surfaces 124 to direct lighting to the side of the aircraft. In this embodiment, the light strip 60 may be a passive or an active light strip 60, consistent with the embodiment discussed above.

Figure 11:
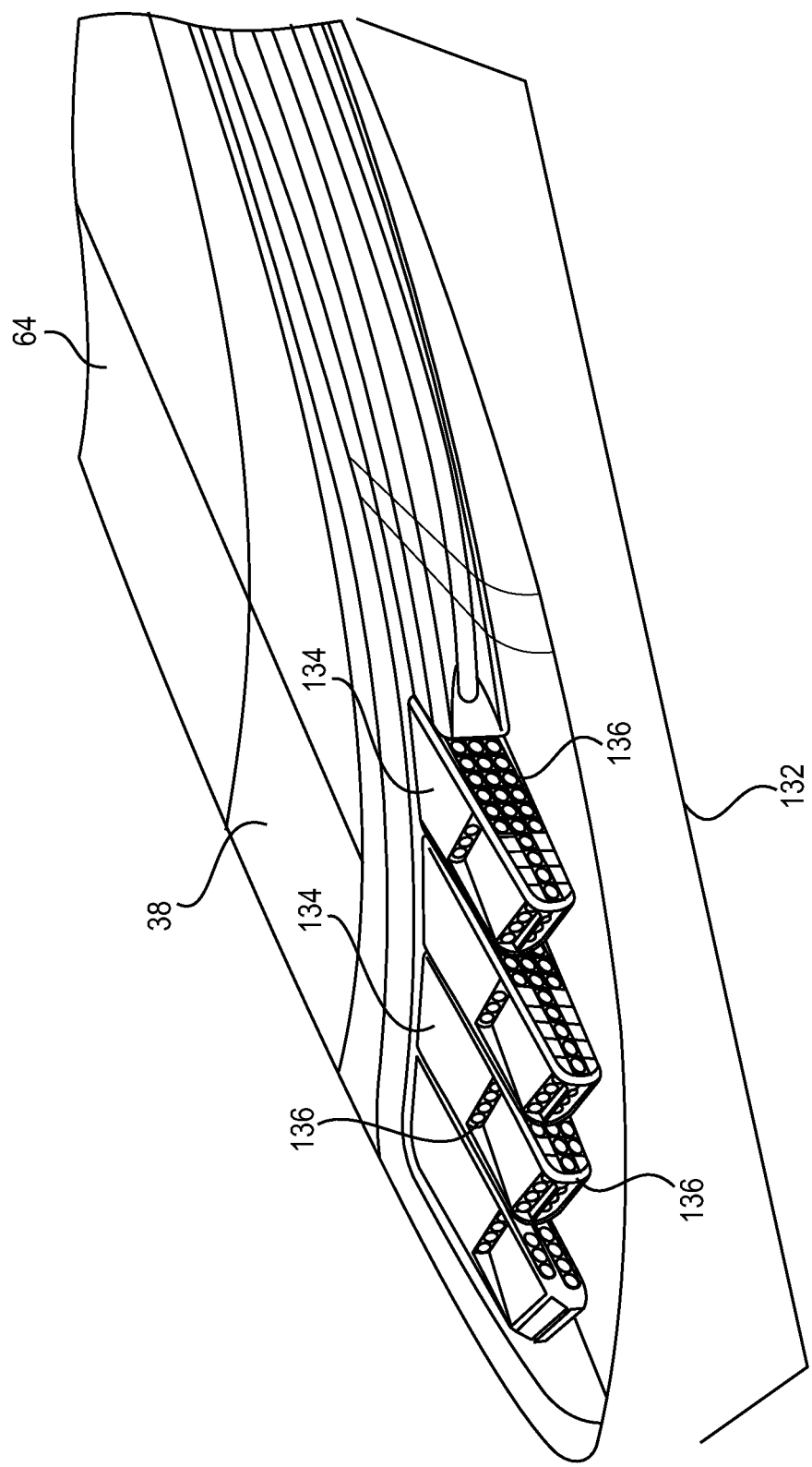
FIG. 11 is a perspective, front view of one additional embodiment of a wingtip lighting group according to the present invention.

FIG. 11 is a perspective, top view of a further contemplated embodiment of the navigational lighting array 132 according to the present invention. This embodiment is consistent with the approach illustrated in FIG. 10. Here, the stepped LED housings 134 have a flatter shape and the LEDs 136 are arranged in a slightly different configuration. The light strip 60 may be passive or active, as previously discussed.

As should be apparent from the many embodiments of the present invention that are discussed herein, the exact shape and construction of the various features of the navigational lighting array 34, 88, 108, 116, 132 may be altered while remaining within the scope of the present invention. Still other variations and equivalents, as should be apparent to those skilled in the art, may be implemented without departing from the scope of the present invention.

With respect to the various embodiments of the light bar 44, 112, it is noted that the light bar 44, 112 is contemplated to be positioned adjacent to the navigational lighting array, outboard of the navigational lighting array 34, 88, 108, 116, 132. As noted above, this includes one or more of the leading edge 114 of the winglet 64, the longitudinal surface 72 of the winglet 64, and the rear edge 76 of the winglet 64. For wings 38 that exclude a winglet 64, the light bar 44, 112 may extend along the leading edge, longitudinal surface, and rear edge of the wing 38.

In an alternative embodiment, it is contemplated that the light bar 44, 112 may be extended to edges of the wing 38 that are inboard of the navigational lighting array 34, 88, 108, 116, 132 without departing from the scope of the present invention.

As noted above, the present invention is described in connection with one or more embodiments thereof. The embodiments are intended to be illustrative of the breadth of the present invention. Focus on any one particular embodiment is not intended to be limiting thereof. The present invention, therefore, is intended to encompass variations and equivalents, as would be appreciated by those skilled in the art.

What is claimed is:

1. A lighting arrangement for an aircraft, comprising:
a navigational lighting group disposed along at least a leading edge of a wing of the aircraft, wherein the navigational lighting group comprises at least a first light emitting source emitting light indicating a right of way and a second light emitting source emitting a strobe light; and
a light bar for non-navigational purposes extending along at least a portion of the leading edge of the wing, adjacent to the navigational lighting group, the light bar being disposed outboard of the navigational lighting group, the light bar being configured to emit non-navigational light along a length thereof,
wherein the light bar is controlled independently of the first light emitting source and the second light emitting source of the navigational lighting group.

2. The lighting arrangement of claim 1, wherein the light bar comprises a plurality of light bars disposed parallel to one another.

3. The lighting arrangement of claim 1, wherein the light bar comprises a plurality of light bars arranged end-to-end.

4. The lighting arrangement of claim 1, wherein the light bar comprises a light source selected from a group comprising a light emitting diode, an organic light emitting diode, a laser, a halogen light bulb, an incandescent light bulb, an electroluminescent material, and a gas-filled bulb.

5. The lighting arrangement of claim 4, wherein the light bar comprises at least one of an active light strip and a passive light strip.

6. The lighting arrangement of claim 1, further comprising a controller, wherein the controller is configured to change at least one of a color of the light, a hue of the light, an intensity of the light, and a pulsation of the light.

7. An aircraft wing, comprising:
a leading edge;
a navigational lighting group positioned along the leading edge, wherein the navigational lighting group comprises at least a first light emitting source emitting light indicating a right of way and a second light emitting source emitting a strobe light; and
a light bar for non-navigational purposes extending along at least a portion of the leading edge, adjacent to the navigational lighting group, the light bar being disposed outboard of the navigational lighting group, the light bar being configured to emit non-navigational light along a length thereof,
wherein the light bar is controlled independently of the first light emitting source and the second light emitting source of the navigational lighting group.

8. The aircraft wing of claim 7, wherein the light bar extends along at least a portion of a longitudinal surface of the wing.

9. The aircraft wing of claim 8, wherein the light bar extends along at least a portion of a rear surface of the wing.

10. The aircraft wing of claim 7, wherein the wing comprises a winglet.

11. The aircraft wing of claim 10, wherein the light bar extends along at least a portion of a leading edge of the winglet.

12. The aircraft wing of claim 11, wherein the light bar extends along at least a portion of a longitudinal surface of the winglet.

13. The aircraft wing of claim 12 wherein the light bar extends along at least a portion of a rear edge of the winglet.

14. The aircraft wing of claim 7, wherein the light bar comprises a plurality of light bars disposed parallel to one another.

15. The aircraft wing of claim 7, wherein the light bar comprises a plurality of light bars arranged end-to-end.

16. The aircraft wing of claim 7, wherein the light bar comprises a light source selected from a group comprising a light emitting diode, an organic light emitting diode, a laser, a halogen light bulb, an incandescent light bulb, an electroluminescent material, and a gas-filled bulb.

17. The aircraft wing of claim 16, wherein the light bar comprises at least one of an active light strip and a passive light strip.

18. The aircraft wing of claim 7, further comprising a controller configured to change at least one of a color of the non-navigational light, a hue of the non-navigational light, an intensity of the non-navigational light, and a pulsation of the non-navigational light.

19. A lighting arrangement for an aircraft, comprising:
a navigational lighting group disposed along at least a leading edge of a wing of the aircraft, wherein the navigational lighting group comprises at least a first light emitting source emitting light indicating a right of way and a second light emitting source emitting a strobe light; and
a decorative light bar providing supplemental lighting in addition to the light from the navigational lighting group, the decorative light bar extending along at least a portion of an edge of the wing and emitting non-navigational light along a length thereof,
wherein the light bar is controlled independently of the first light emitting source and the second light emitting source of the navigational lighting group.

20. The lighting arrangement of claim 19, wherein the decorative light bar is positioned adjacent to the navigational lighting group.

21. The lighting arrangement of claim 20, wherein the decorative light bar is positioned outboard of the navigational lighting group.

22. A lighting arrangement for an aircraft, comprising:
a navigational lighting group disposed along at least a leading edge of a wing of the aircraft, wherein the navigational lighting group comprises at least a first light emitting source emitting light indicating a right of way and a second light emitting source emitting a strobe light; and
an accent light bar providing non-navigational accent lighting along a length thereof, the accent light bar extending along at least a portion of the leading edge of the wing and emitting non-navigational light along a length thereof,
wherein the accent light bar is controlled independently of the first light emitting source and the second light emitting source of the navigational lighting group, and
wherein a color of the accent lighting provided by the accent light bar is changeable.

23. The lighting arrangement of claim 22, wherein the accent light bar is positioned adjacent to the navigational lighting group.

24. The lighting arrangement of claim 23, wherein the accent light bar is positioned outboard of the navigational lighting group.

* * * * *